(12) United States Patent
Line et al.

(10) Patent No.: US 10,286,815 B2
(45) Date of Patent: May 14, 2019

(54) H-POINT LIFT OPTIONS FOR SLEEPER SEATS

(71) Applicant: Ford Global Technologies, LLC, Dearborn, MI (US)

(72) Inventors: Johnathan Andrew Line, Northville, MI (US); Marcos Silva Kondrad, Macomb, MI (US); Kevin Wayne Preuss, Berkley, MI (US); Keith Allen Godin, Dearborn, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/477,129

(22) Filed: Apr. 3, 2017

(65) Prior Publication Data

US 2018/0281631 A1 Oct. 4, 2018

(51) Int. Cl.
| | |
|---|---|
| *B60N 2/90* | (2018.01) |
| *B60N 2/34* | (2006.01) |
| *B60N 2/18* | (2006.01) |
| *B60N 2/20* | (2006.01) |
| *B60N 2/22* | (2006.01) |
| *B60N 2/28* | (2006.01) |
| *B60N 2/02* | (2006.01) |

(52) U.S. Cl.
CPC ............ *B60N 2/20* (2013.01); *B60N 2/1803* (2013.01); *B60N 2/1878* (2013.01); *B60N 2/22* (2013.01); *B60N 2/34* (2013.01); *B60N 2/914* (2018.02); *B60N 2/02* (2013.01); *B60N 2/2878* (2013.01)

(58) Field of Classification Search
CPC . B60N 2/914; B60N 2/22; B60N 2/34; B60N 2/1803; B60N 2/0232; B60N 2/1878; B60N 2/23; A47C 7/022; A47C 1/0244; A47C 7/14; A47C 7/464
See application file for complete search history.

(56) References Cited

U.S. PATENT DOCUMENTS

| | | | | |
|---|---|---|---|---|
| 2,576,343 | A | | 11/1951 | Hibbard et al. |
| 2,783,826 | A | * | 3/1957 | Haltenberger ........... B60N 2/23 297/362.11 |
| 3,288,527 | A | * | 11/1966 | Martens .................... B60N 2/23 297/362.13 |
| 3,356,411 | A | * | 12/1967 | Homier .................... B60N 2/23 297/362.12 |
| 4,516,805 | A | * | 5/1985 | Leeper .................. A47C 1/0244 297/188.07 |

(Continued)

FOREIGN PATENT DOCUMENTS

JP H0775608 A 3/1995

*Primary Examiner* — Timothy J Brindley
(74) *Attorney, Agent, or Firm* — Vichit Chea; Price Heneveld LLP

(57) ABSTRACT

A seating assembly includes a seat. A seatback is rotatably coupled with the seat to a fully reclined position. A rear seat lift device includes a mechanism disposed below a cushion support proximate a rear portion of the seat and is operable between a lowered position and a raised position. A rear portion of the seat is elevated relative to the seatback to minimize a height difference between the rear portion of the seat and a bottom portion of the seatback when the seatback is in the fully reclined position.

18 Claims, 8 Drawing Sheets

(56) References Cited

U.S. PATENT DOCUMENTS

| | | | |
|---|---|---|---|
| 4,626,028 A | 12/1986 | Hatsutta et al. | |
| 4,709,961 A | 12/1987 | Hill | |
| 4,722,550 A * | 2/1988 | Imaoka | A47C 7/022 280/727 |
| 4,832,400 A | 5/1989 | Aoki et al. | |
| 4,898,424 A * | 2/1990 | Bell | B60N 2/23 297/367 R |
| 5,058,953 A | 10/1991 | Takagi et al. | |
| 5,364,164 A | 11/1994 | Kuranami | |
| 5,567,011 A | 10/1996 | Sessini | |
| 5,836,648 A | 11/1998 | Karschin et al. | |
| 6,135,558 A | 10/2000 | Behrens et al. | |
| 6,155,644 A * | 12/2000 | Rogala | B60N 2/23 297/367 R |
| 6,439,636 B1 | 8/2002 | Kuo | |
| 6,565,153 B2 | 5/2003 | Hensel et al. | |
| 6,578,916 B2 * | 6/2003 | Longhi | B60N 2/0224 297/284.3 |
| 6,578,918 B1 * | 6/2003 | Rinne | A47C 7/022 297/312 |
| 6,719,368 B1 | 4/2004 | Neale | |
| 6,851,755 B2 * | 2/2005 | Dinkel | A47C 4/54 297/452.48 |
| 7,025,420 B2 | 4/2006 | Guinea Peña et al. | |
| 7,055,904 B2 | 6/2006 | Skelly et al. | |
| 7,152,920 B2 * | 12/2006 | Sugiyama | B60N 2/002 297/284.6 |
| 7,523,888 B2 | 4/2009 | Ferry et al. | |
| 7,644,982 B2 | 1/2010 | Paluch | |
| 7,845,729 B2 | 12/2010 | Yamada et al. | |
| 7,857,381 B2 | 12/2010 | Humer et al. | |
| 7,934,762 B2 | 5/2011 | Hollenbeck et al. | |
| 8,033,610 B2 | 10/2011 | Graber et al. | |
| 8,201,890 B1 | 6/2012 | Nagoaka Mihara | |
| 8,262,164 B2 | 9/2012 | Ito et al. | |
| 8,528,978 B2 | 9/2013 | Purpura et al. | |
| 8,783,781 B1 * | 7/2014 | McClure | A47C 4/54 297/452.41 |
| 8,899,683 B2 | 12/2014 | Ito | |
| 8,998,327 B2 | 4/2015 | Cooney | |
| 9,187,019 B2 | 11/2015 | Dry et al. | |
| 9,399,418 B2 | 7/2016 | Line et al. | |
| 9,421,894 B2 | 8/2016 | Line et al. | |
| 9,452,838 B2 | 9/2016 | Meister et al. | |
| 9,566,888 B2 | 2/2017 | Kolich et al. | |
| 9,573,502 B2 | 2/2017 | Seki et al. | |
| 9,596,940 B2 | 3/2017 | Petzel et al. | |
| 9,610,872 B2 | 4/2017 | Dry et al. | |
| 9,649,962 B2 | 5/2017 | Line et al. | |
| 2002/0056709 A1 * | 5/2002 | Burt | A47C 4/54 219/217 |
| 2005/0067868 A1 * | 3/2005 | Kern | F16K 11/0716 297/284.6 |
| 2005/0110319 A1 * | 5/2005 | Villalobos | A47C 1/03211 297/320 |
| 2005/0225145 A1 | 10/2005 | Furtado et al. | |
| 2010/0066136 A1 | 3/2010 | D'Agostini | |
| 2012/0068517 A1 | 3/2012 | Yetukuri et al. | |
| 2012/0112507 A1 * | 5/2012 | Cerreto | A61G 5/1067 297/313 |
| 2012/0139300 A1 * | 6/2012 | Marais | B64D 11/06 297/68 |
| 2012/0217779 A1 * | 8/2012 | Gaither | B60N 2/242 297/316 |
| 2014/0159457 A1 * | 6/2014 | Jaranson | B60N 2/22 297/362 |
| 2014/0203615 A1 | 7/2014 | Little | |
| 2015/0035323 A1 * | 2/2015 | Diop | B60N 2/914 297/180.14 |
| 2016/0129920 A1 * | 5/2016 | Hall | B60W 50/16 701/1 |
| 2016/0159251 A1 * | 6/2016 | Ebina | B60N 2/0244 701/49 |
| 2016/0159253 A1 * | 6/2016 | Frasher | B60N 2/10 296/65.01 |
| 2016/0257313 A1 * | 9/2016 | Yin | B60N 2/995 |
| 2016/0355114 A1 | 12/2016 | Line et al. | |
| 2017/0086588 A1 * | 3/2017 | Patrick | B64D 11/0647 |
| 2017/0164747 A1 * | 6/2017 | Zouzal | A47C 7/14 |
| 2017/0297660 A1 * | 10/2017 | Neese | B63B 29/04 |
| 2018/0079335 A1 * | 3/2018 | Jaranson | B60N 2/914 |
| 2018/0111520 A1 * | 4/2018 | Lem | B60N 2/914 |

* cited by examiner

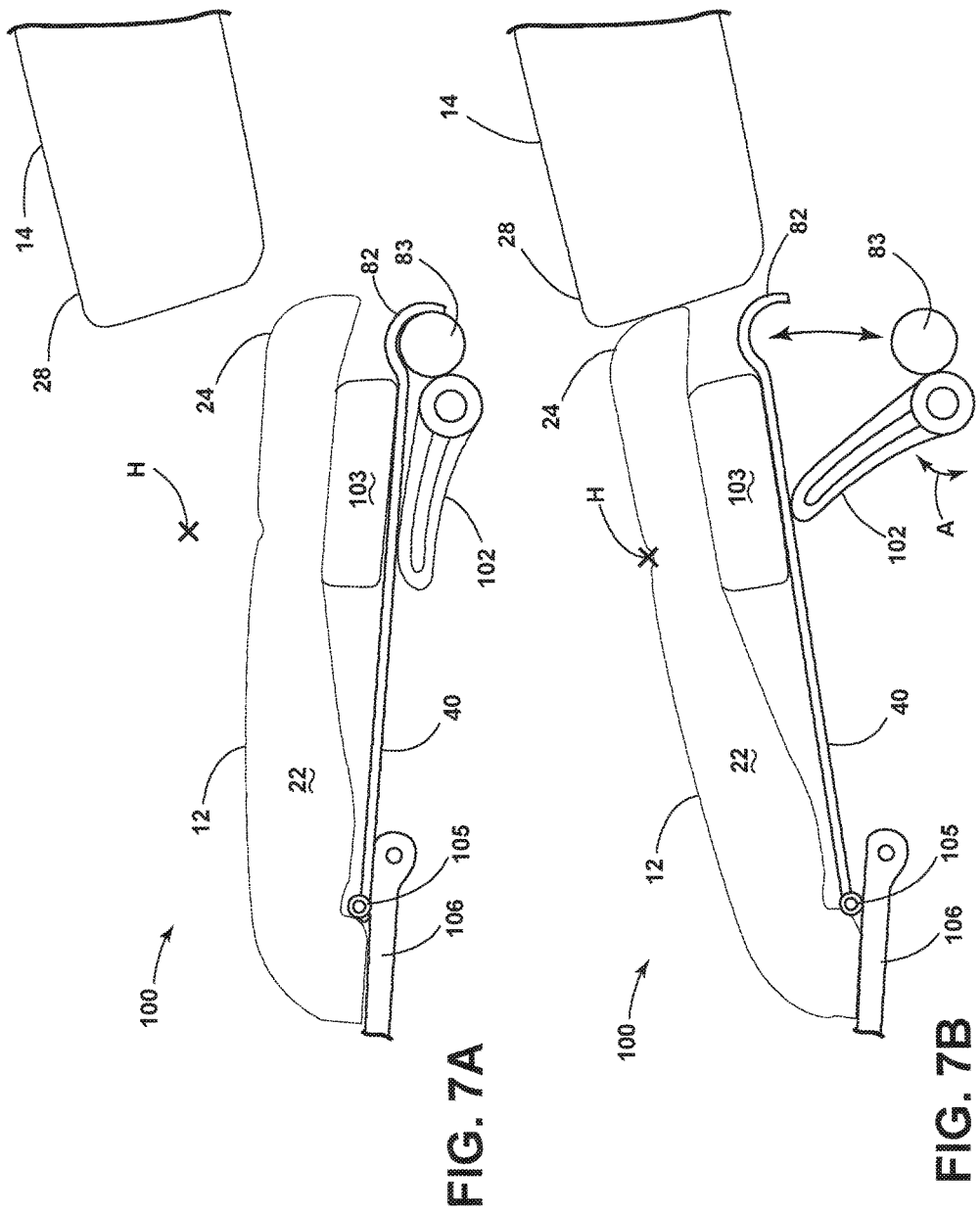

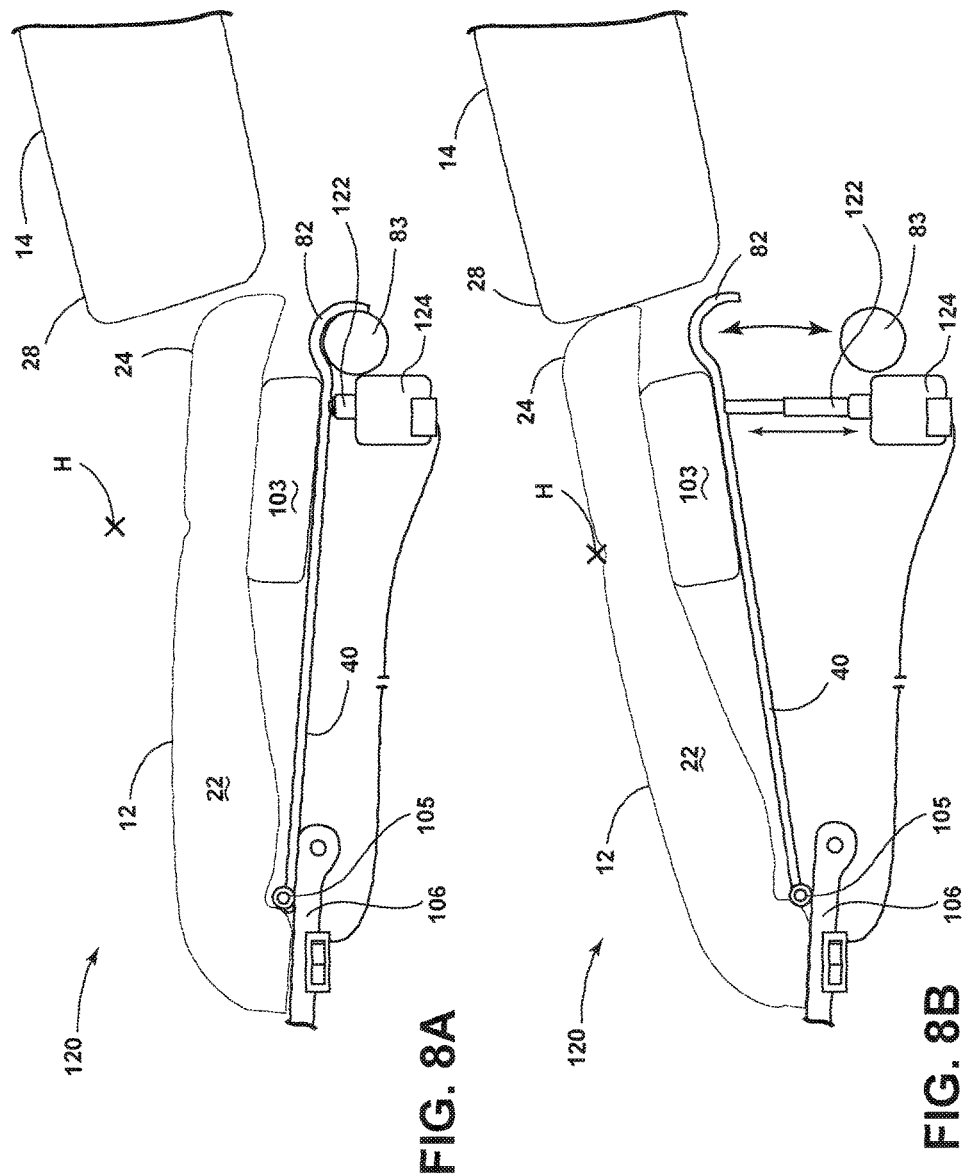

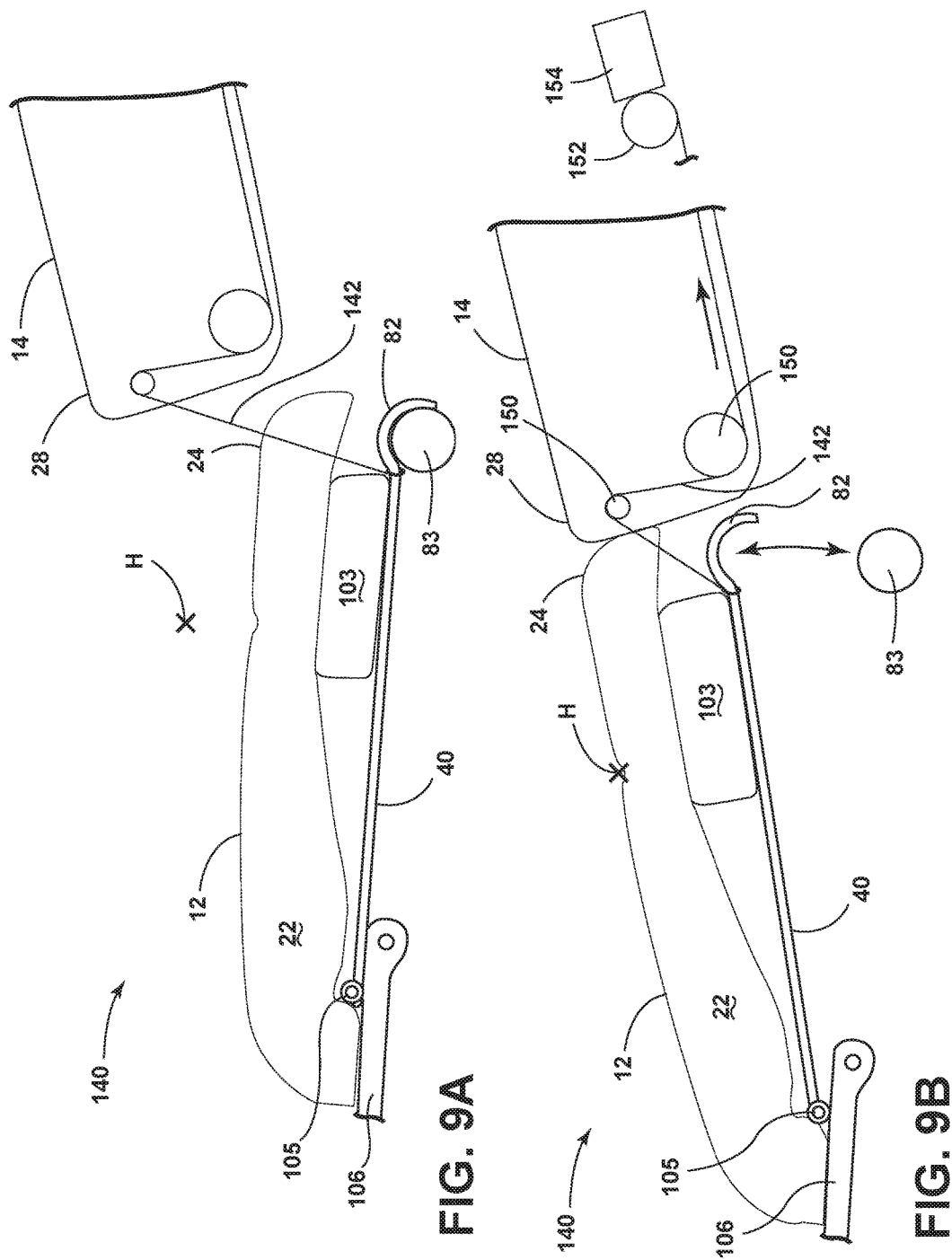

H-POINT LIFT OPTIONS FOR SLEEPER SEATS

FIELD OF THE DISCLOSURE

The present disclosure generally relates to a seating assembly, and more particularly, to H-point lift options for sleeper seats for a seating assembly.

BACKGROUND OF THE DISCLOSURE

Seating assemblies and the flexible nature of those seating assemblies is becoming more important in today's world. The value of having an adjustable seating assembly provides increased worktime and increased comfort to an individual. Some seating assemblies include upper thoracic support that is adjustable between forward and rearward positions. Providing an aesthetically pleasing upper back support that is consistent with and generally seamless with the remainder of the seat provides value to the consumer.

SUMMARY OF THE DISCLOSURE

According to one aspect of the present disclosure, a seating assembly includes a seat. A seatback is rotatably coupled with the seat to a fully reclined position. A rear seat lift device includes a mechanism disposed below a cushion support proximate a rear portion of the seat and is operable between a lowered position and a raised position. A rear portion of the seat is elevated relative to the seatback to minimize a height difference between the rear portion of the seat and a bottom portion of the seatback when the seatback is in the fully reclined position.

According to another aspect of the present disclosure, a seating assembly includes a seat. A seatback is rotatably coupled with the seat to a fully reclined position. A rear seat lift device includes a bladder assembly operable between a deflated condition and an inflated condition. A rear portion of the seat is elevated to minimize a height difference between the rear portion of the seat and a bottom portion of the seatback.

According to yet another aspect of the present disclosure, a seating assembly includes a seat. A seatback is rotatably coupled with the seat to a fully reclined position. A rear seat lift device is disposed below the seat and is operable to elevate only a rear portion of the seat relative to the seatback to align the rear portion of the seat with a bottom portion of the seatback when the seatback is in the fully reclined position.

According to still another aspect of the present disclosure, a seating assembly configured for use as a vehicle seating assembly includes a seat and seatback. The seatback is rotatably coupled with the seat to a fully reclined position and a full upright position. A rear seat lift device is disposed below the seat, and is configured to elevate a rear portion of the seat relative to the seatback to align a rear portion of the seat with a bottom portion of the seatback when the seatback is fully reclined. The seat also includes a thigh support and a leg support configured to elevate the legs of an occupant, providing a comfortable, yet firm, support surface to an occupant that can be used when an occupant is not driving a vehicle, but instead desires to rest.

Embodiments of the first aspect, the second aspect, or the third aspect of the invention may include any one or a combination of the following features:

- a rear seat lift device includes a bladder assembly having at least one baffle;
- the rear seat lift device elevates a rear portion of the seat between 60 and 80 mm;
- a fluid pump is disposed within the seating assembly and is in fluid communication with the bladder assembly of the rear seat lift device to affect transition of a bladder from a deflated position to an inflated position;
- the bladder assembly includes a plurality of distinct and independent bladders in fluid communication with a fluid pump;
- a cable assembly is operably coupled with a cushion support and is configured to draw the cushion support upward;
- the cable assembly is operably coupled with a motor that is controlled by an actuation device configured to be operable by a user;
- the cable assembly is operably coupled with a manual lever that is configured for manual adjustment by a user; and
- cushion wire suspension hooks at a rear portion of the cushion support are raised to elevate the rear portion of the seat.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 7A is a partial side cross-sectional view of a seat including a mechanical arm in a raised position;

FIG. 7B is a partial side cross-sectional view of a seat including a mechanical arm in a lowered position;

FIG. 8A is a partial side cross-sectional view of a seat including a hydraulic or pneumatic arm in a raised position;

FIG. 8B is a partial side cross-sectional view of a seat including a hydraulic or pneumatic arm in a lowered position;

FIG. 9A is a partial side cross-sectional view of a pulley system in a loosened condition; and FIG. 9B is a partial side-cross-sectional view of a pulley system in a drawn condition.

DETAILED DESCRIPTION OF THE EMBODIMENTS

Figure 1:
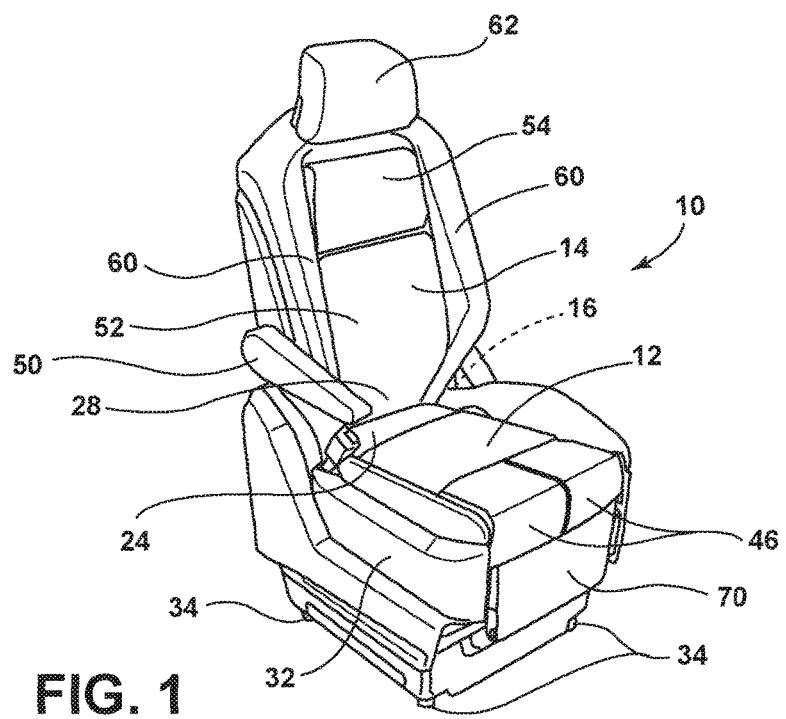
FIG. 1 is a top perspective view of one embodiment of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. It will be understood for the various constructions set forth herein that the same or identical features may include like reference numerals.

Referring to the embodiment generally illustrated in FIGS. 1-9B, reference numeral 10 generally designates a seating assembly that includes a seat 12. A seatback 14 is rotatably coupled with the seat 12 to a fully reclined position. A rear seat lift device 16 includes a mechanism 20 disposed below a cushion support 22 proximate a rear portion 24 of the seat 12, and is operable between a lowered position and a raised position. The rear portion 24 of the seat 12 is elevated relative to the seatback 14 to minimize a height difference between the rear portion 24 of the seat 12 and a bottom portion 28 of the seatback 14 when the seatback 14 is in the fully reclined position.

With reference to FIG. 1, the seating assembly 10 is generally constructed for use in a variety of environments, including residential or commercial applications, as well as in a vehicle 30, such as a car, truck, or van. The seating assembly 10 generally includes a seat base 32 supported on feet 34. The feet 34 may be operably coupled with a floor 36 of the vehicle 30. It will be understood that the feet 34 may be slidably coupled with the floor 36 or may maintain a stationary position relative to the floor 36 of the vehicle 30. The seat base 32 extends upwardly from the feet 34 and is configured to support a suspension assembly 40 (FIG. 6) and the seat 12. The seat 12 includes the cushion support 22, which is configured to provide comfort to an occupant. In addition to the rear portion 24, the seat 12 also includes a forward portion 44. The forward portion 44 may include independent thigh supports 46 configured to independently support each leg of an occupant (FIG. 1). The seatback 14 is operably coupled with the seat 12, and is configured to pivot relative to the seat 12. In addition, the seatback 14 may include one or more seatback arms 50 pivotally coupled with the seatback 14. The seatback arms 50 provide support to the arms of an occupant. The seatback 14 includes a lower lumbar cushion 52 and an upper thoracic cushion 54. The upper thoracic cushion 54 is disposed proximate an actuator 56 (such as a paddle or bladder) and configured to rotate relative to the seatback 14. The seatback 14 also includes side bolsters 60 configured to cradle the sides of an occupant. A head restraint 62 is disposed on the seatback 14, and is operable between a plurality of vertical positions relative to the seatback 14.

Figure 2:
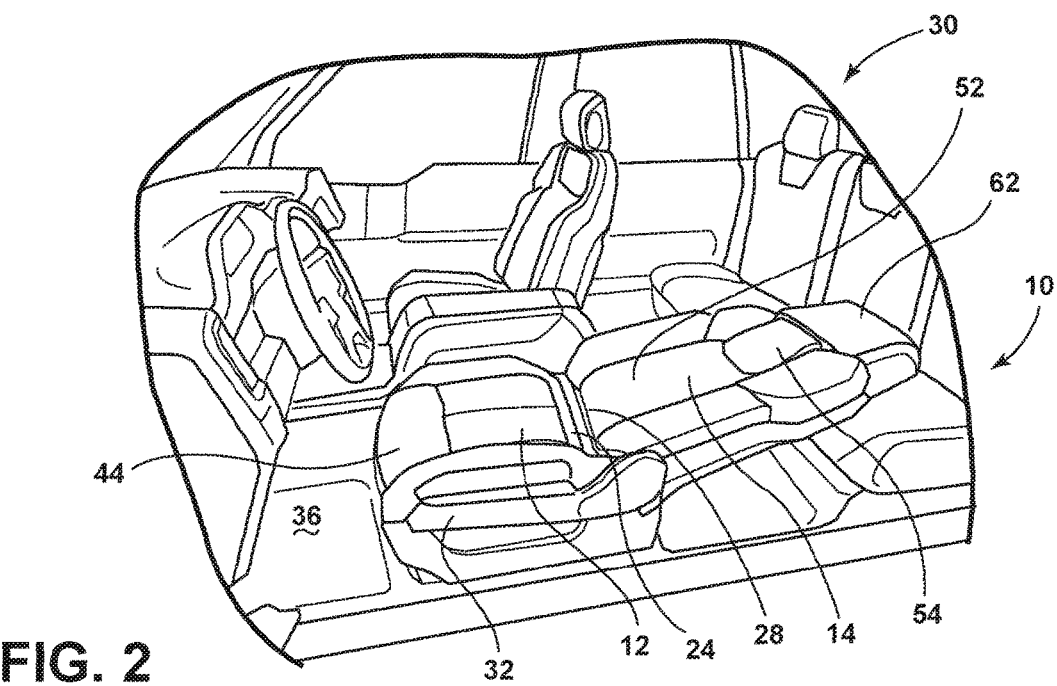
FIG. 2 is a top perspective view of a seating assembly of the present disclosure with the seating assembly in a fully reclined position.

Referring again to FIGS. 1 and 2, the seating assembly 10 is generally configured to provide resting or sleeping accommodations to an occupant. More specifically, the seatback 14 is configured to pivot rearward relative to the seat 12, such that the seat 12 and the seatback 14 are aligned or nearly aligned (FIG. 2). In this configuration, the seating assembly 10 can provide comfort to an occupant that wishes to rest or sleep for a period of time without leaving the safety of the vehicle 30. In an effort to provide increased comfort and support to the upper back of an occupant, the actuator 56 can be activated to move the upper thoracic cushion 54 into abutting contact with an upper portion of the back of an occupant. This additional support lessens strain on the head and neck of the occupant.

Figure 3:
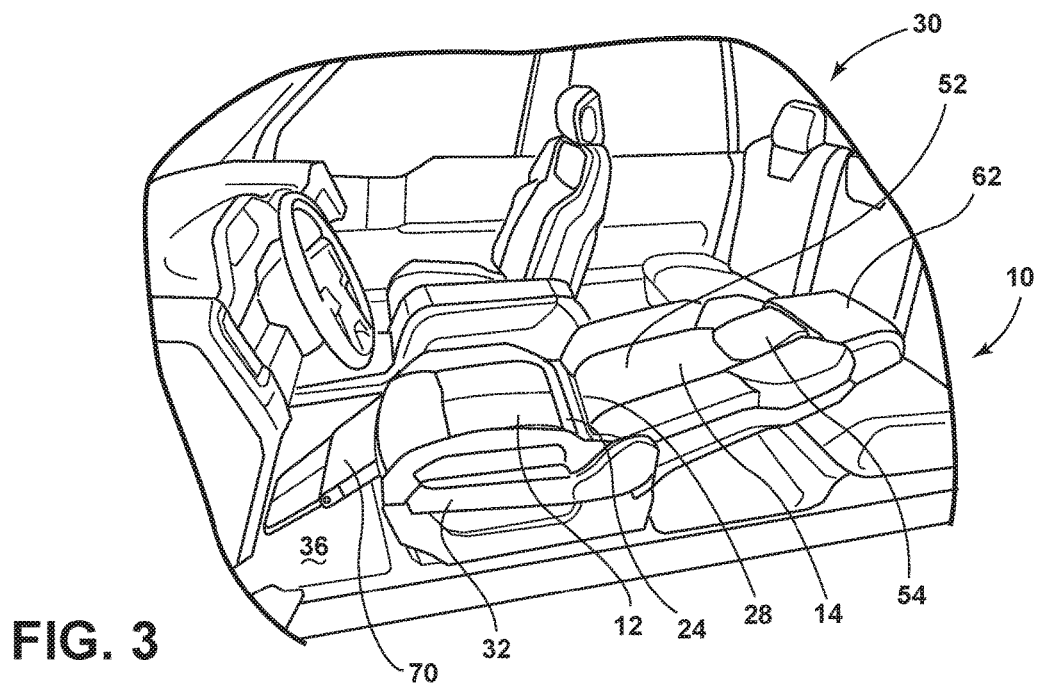
FIG. 3 is a top perspective view of a seating assembly of the present disclosure with the seating assembly in a fully reclined position and a leg support of the seating assembly in a deployed position.
Figure 4:
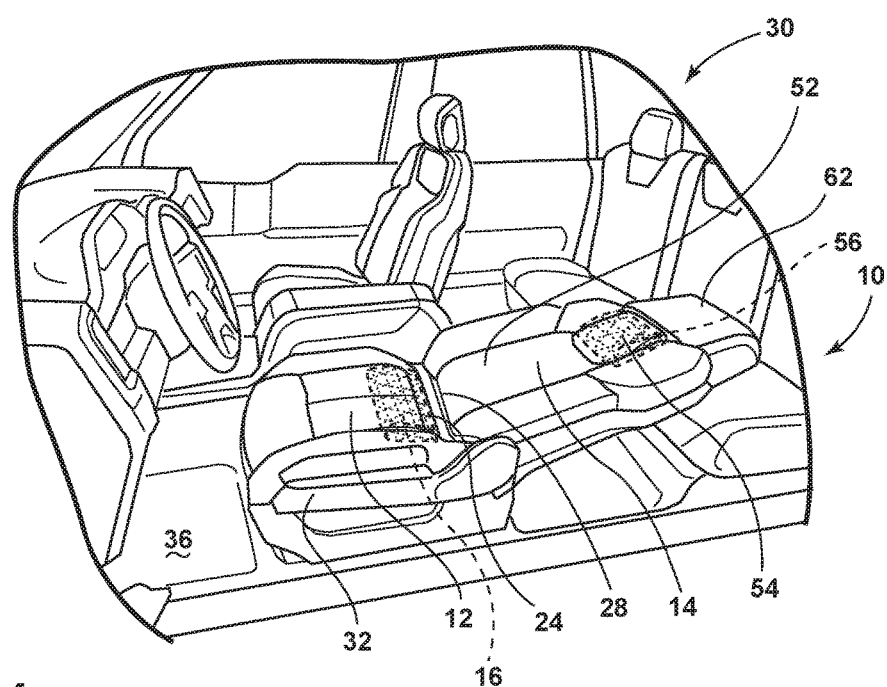
FIG. 4 is a top perspective view of a seating assembly of the present disclosure with the seatback reclined and bladder assemblies disposed in the seat and the seatback shown in phantom.

With reference now to FIGS. 3 and 4, the seating assembly 10 is generally configured to provide comfort to a passenger while driving the vehicle 30, as well as while resting within the vehicle 30. As shown in FIG. 3, the seatback 14 can be reclined relative to the seat 12. In addition, a calf or lower leg support 70 is configured to rotate between extended and retracted positions. In the retracted position, the lower leg support 70 extends generally vertically downward below the seatback 14. However, when moved to the extended position, the lower leg support 70 provides support to the lower legs and feet of the occupant, providing a more comfortable experience for the occupant while resting or sleeping.

With reference again to FIG. 4, in addition to the features already disclosed, the rear seat lift device 16, which is located at the rear portion 24 of the seat 12 below the seat 12, can be moved between raised and lowered positions to accommodate the occupant. In addition, the upper thoracic cushion 54, and specifically, the actuator 56, can be adjusted to provide support to the upper back and neck of the occupant. It is generally understood that these features of the seating assembly 10 may be adjusted manually by the occupant, or may adjust automatically, depending on user preferences. It is also contemplated that the occupant may be able to decide between automatic and manual activation of these features.

Figure 5A:
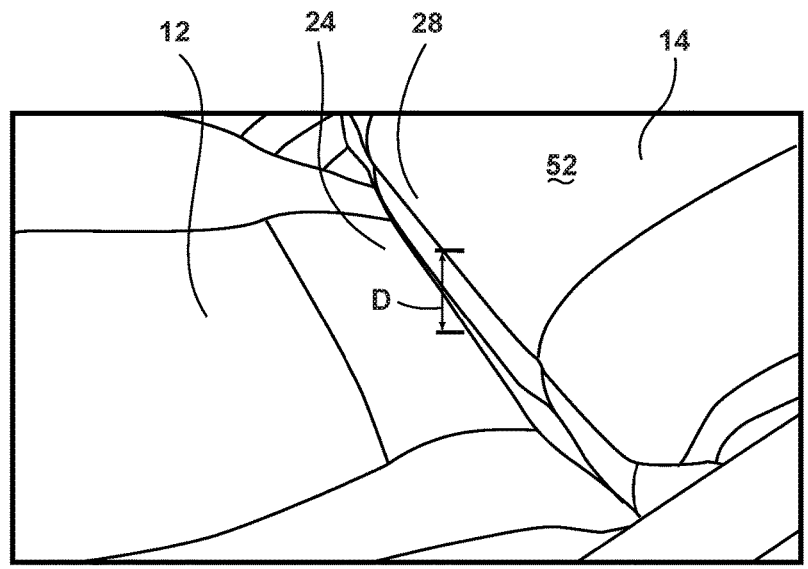
FIG. 5A is a partial top perspective view of an interface of a seat and a seatback with a rear seat lift device of the seating assembly in a raised position.
Figure 5B:
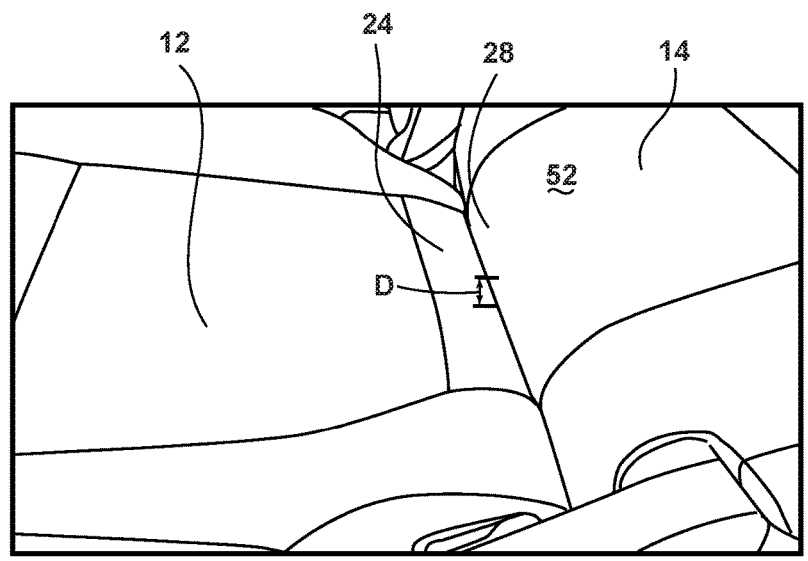
FIG. 5B is a partial top perspective view of an interface of a seat and a seatback with a rear seat lift device of the seating assembly in a lowered position.

With reference now to FIGS. 5A and 5B, the rear seat lift device 16 is configured to elevate the rear portion 24 of the seat 12 from a lowered position (FIG. 5A) to a raised position (FIG. 5B). This results in a distance D (the vertical distance between occupant contact surfaces of the seat 12 and the seatback 14) to decrease. Notably, the amount that the rear portion 24 of the seat 12 raises may be based on user preferences, which may be largely guided by the size and weight of the occupant. However, it will also be understood that the rear seat lift device 16 may engage and raise the rear portion 24 of the seat 12 automatically as a function of the seatback 14 rotating rearward. Movement of the rear seat lift device 16 from the lowered position to the raised position helps align the rear portion 24 of the seat 12 with the bottom portion 28 of the seatback 14. As a result, an abrupt ledge that might otherwise be located between the seat 12 and the seatback 14, when the seatback 14 is fully reclined, is minimized or eliminated.

Figure 6:
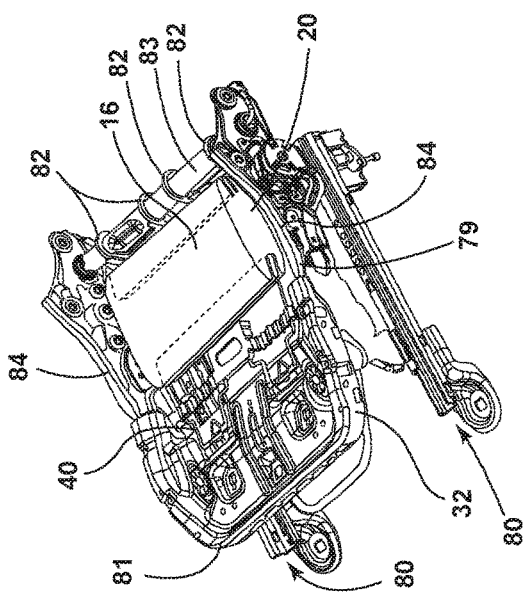
FIG. 6 is a top perspective view of a seat base of the present disclosure having a bladder assembly disposed therein.

With reference now to FIG. 6, the seat base 32 is illustrated with the rear seat lift device 16 disposed thereon. The seat base 32 includes a frame 79 that is shown supported on slide assemblies 80. The suspension assembly 40 extends rearward from a front cushion pan 81 that may be rotatable relative to the frame 79. Rear hooks 82 of the suspension assembly 40 engage a rear torsion bar 83 that extends between side members 84 of the frame 79. For the various rear seat lift devices 16 set forth herein, it will be understood that the rear seat lift devices 16 may be disposed above or below the suspension assembly 40. If the rear seat lift device 16 is disposed above the suspension assembly 40, then the rear seat lift device 16 may be configured to lift the rear portion 24 of the seat 12, and specifically the cushion support 22, upward. If the rear seat lift device 16 is disposed below the suspension assembly 40, the rear seat lift device 16 may force the suspension assembly 40, and possibly the rear hooks 82 upward proximate the rear portion 24 of the seat 12, thus raising a rear portion of the cushion support 22.

Figure 6A:
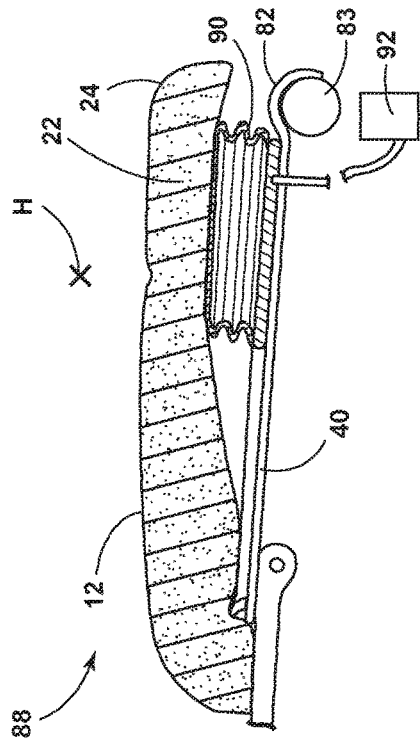
FIG. 6A is a partial side cross-sectional view of a seat including a bladder assembly in a deflated condition.
Figure 6B:
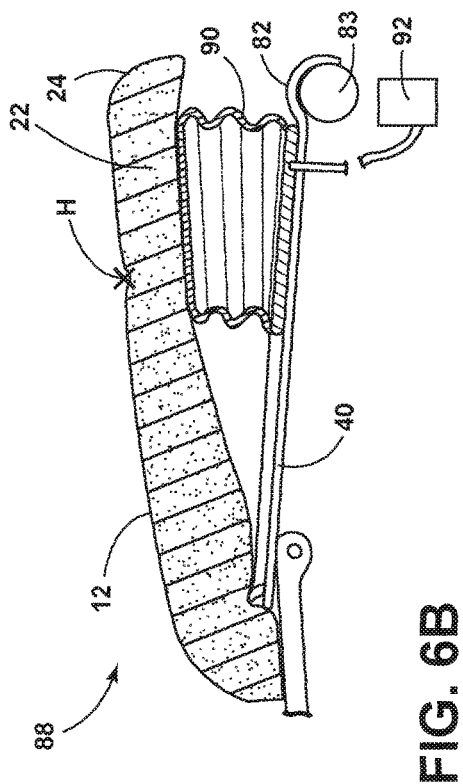
FIG. 6B is a partial side cross-sectional view of a seat including a bladder assembly in an inflated condition.

With reference now to FIGS. 6A and 6B, a seating assembly 88 is illustrated that includes a bladder assembly 90 that is disposed below the seat 12 and is operable to elevate the rear portion 24 of the seat 12. More specifically, upon activation of a pump 92 that is in fluid communication with the bladder assembly 90, the rear portion 24 of the seat 12 moves from a lowered position to a raised position. It will also be understood that the bladder assembly 90 may be filled only partway, depending on the preferences of the occupant. The pump 92 may pump water, air, hydraulic fluid, etc., into the bladder assembly 90. In this construction, the bladder assembly 90 is positioned between the suspension assembly 40 and a bottom of the cushion support 22 of the seat 12. As the bladder assembly 90 inflates, a space defined between the suspension assembly 40 and the seat 12 enlarges, thus raising the rear portion 24 of the seat 12. The bladder assembly 90 may raise the rear portion 24 of the seat 12 to better align the rear portion 24 with the bottom portion 28 of the seatback 14. In the illustrated construction of FIGS. 6A and 6B, the seating surface of the seat 12 is raised to align with the H-point of a typical occupant when the seat 12 is in the design position (FIG. 6A).

With reference now to FIGS. 7A and 7B, a seating assembly 100 is illustrated having a rear seat lift device 16 that includes a rotatable mechanical lever 102 configured to raise the suspension assembly 40 between a lowered position (FIG. 7A) and a raised position (FIG. 7B). The rotatable mechanical lever 102 may be manually rotated or rotated via a motorized assembly in the direction of arrow A. The suspension assembly 40 rotates about a forward pivot 105 disposed on or adjacent a front cushion pan 106. In one instance, it is generally contemplated that the rear portion 24 of the seat 12 is raised to align a top surface of the seat 12 with an H-point (H) of the occupant, such that the legs, buttocks, and back of the occupant are generally aligned on the seating assembly 10. A lower support 103 is disposed between the cushion support 22 and the suspension assembly 40.

With reference now to FIGS. 8A and 8B, a seating assembly 120 includes a cylinder 122 in the form of a pneumatic cylinder or a hydraulic cylinder that is operable between a lowered position (FIG. 8A) and a raised position (FIG. 8B). The cylinder 122 is operable to elevate the suspension assembly 40, thereby raising the rear portion 24 of the seat 12 to a heightened position generally aligned with a seating surface of the seatback 14. As illustrated, the seating surface of the seat 12 is raised to generally align with a typical H-point of the seat 12. A switch 123 is configured to operate a motor 124 that raises and lowers the cylinder 122.

With reference now to FIGS. 9A and 9B, a seating assembly 140 includes a tension cable assembly 142 that is configured to raise the rear portion 24 of the seat 12 into alignment with a seating surface of the seatback 14. As the seat 12 elevates, a seating surface of the seat 12 and a seating surface of the seatback 14 are generally aligned. In the illustrated embodiment, the tension cable assembly 142 includes a cable 144 that is operably coupled with the suspension assembly 40 proximate the rear hooks 82. The cable 144 wraps about a portion of one or more pulley wheels 150, and ultimately wraps about a spool 152 that can be rotated by a motor 154. Activation of the motor 154 results in the rotation of the spool 152, which pulls the rear portion 24 of the seat 12 upward. Unwinding of the spool 152 allows the cable 144 to withdraw from the spool 152, such that the rear portion 24 of the seat 12 can drop, thereby allowing abutting contact of the rear hooks 82 with the rear torsion bar 83.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
a seat;
a seatback rotatably coupled with the seat to a fully reclined position;
a rear seat lift device including a mechanism disposed below a cushion support proximate a rear portion of the seat and operable between a lowered position and a raised position, wherein a rear portion of the seat pivots upward about a front of the seat and is elevated relative to the seatback to minimize a height difference between the rear portion of the seat and a bottom portion of the seatback when the seatback is in the fully reclined position.

2. The seating assembly of claim 1, wherein the rear seat lift device includes a bladder assembly having at least one baffle.

3. The seating assembly of claim 1, wherein the rear seat lift device elevates a rear portion of the seat between 60 and 80 mm.

4. The seating assembly of claim 2, further comprising:
a fluid pump disposed within the seating assembly and in fluid communication with the bladder assembly of the rear seat lift device to affect transition of a bladder from a deflated position to an inflated position.

5. The seating assembly of claim 2, wherein the bladder assembly includes a plurality of distinct and independent bladders in fluid communication with a fluid pump.

6. The seating assembly of claim 1, further comprising:
a cable assembly operably coupled with the cushion support and configured to draw the cushion support upward.

7. The seating assembly of claim 6, wherein the cable assembly is operably coupled with a motor that is controlled by an actuation device configured to be operable by a user.

8. The seating assembly of claim 6, wherein the cable assembly is operably coupled with a manual lever that is configured for manual adjustment by a user.

9. The seating assembly of claim 6, wherein cushion wire suspension hooks at a rear portion of the cushion support are raised to elevate the rear portion of the seat.

10. A seating assembly comprising:
a seat;
a seatback rotatably coupled with the seat to a fully reclined position;
a rear seat lift device including a bladder assembly operable between a deflated position and an inflated position, wherein a rear portion of the seat is rotated upward relative to a front portion of the seat to minimize a height difference between the rear portion of the seat and a bottom portion of the seatback.

11. The seating assembly of claim 10, wherein the bladder assembly includes at least one baffle.

12. The seating assembly of claim 10, wherein the bladder assembly inflates to elevate the rear portion of the seat between 60 and 80 mm.

13. The seating assembly of claim 10, further comprising:
a fluid pump disposed within the seating assembly and in fluid communication with the bladder assembly to affect transition of the bladder assembly from the deflated position to the inflated position.

14. The seating assembly of claim 10, wherein the bladder assembly includes a plurality of distinct and independent bladders in fluid communication with a fluid pump.

15. A seating assembly comprising:
a seat;
a seatback rotatably coupled with the seat to a fully reclined position;
a rear seat lift device disposed below the seat and operable to elevate only a rear portion of the seat about a front of the seat and relative to the seatback to align the rear portion of the seat with a bottom portion of the seatback when the seatback is in the fully reclined position.

16. The seating assembly of claim 15, wherein the rear seat lift device includes a bladder assembly having at least one baffle.

17. The seating assembly of claim 15, wherein the rear seat lift device elevates a rear portion of the seat between 60 and 80 mm.

18. The seating assembly of claim 15, further comprising:
a fluid pump disposed within the seating assembly and in fluid communication with a bladder assembly of the rear seat lift device to affect transition of a bladder from a deflated position to an inflated position.

* * * * *